United States Patent [19]

Ide et al.

[11] Patent Number: 4,910,057

[45] Date of Patent: Mar. 20, 1990

[54] MELT EXTRUDED ELONGATED MEMBER SUITABLE FOR IMPROVED SERVICE AS A STIFFENING SUPPORT IN AN OPTICAL FIBER CABLE

[75] Inventors: Yoshiaki Ide, No. Plainfield; Gabor Kiss; Hyun N. Yoon, both of Summit, all of N.J.

[73] Assignee: Hoechst Celanese Corporation, Somerville, N.J.

[21] Appl. No.: 364,824

[22] Filed: Apr. 2, 1982

[51] Int. Cl.⁴ .......................... G02B 6/44; B32B 9/00
[52] U.S. Cl. .................................. 428/36.9; 350/96.23; 428/364; 428/392; 428/397; 528/190; 528/206
[58] Field of Search .............. 428/392, 397, 364, 398, 428/36.9, 401; 528/190, 206; 350/96.23

[56] References Cited

U.S. PATENT DOCUMENTS

4,161,470 7/1979 Colundann .......................... 524/599

Primary Examiner—George F. Lesmes
Assistant Examiner—James B. Monroe
Attorney, Agent, or Firm—Burns, Doane, Swecker & Mathis

[57] ABSTRACT

The present invention provides a highly elongated member of substantially uniform cross-sectional configuration which is capable of improved service as a stiffening support in an optical fiber cable. Such elongated member is the product of melt extrusion through an appropriate orifice of a thermotropic liquid crystalline polymer (as described). The resulting elongated member has been found to offer significant advantages when compared to stiffening supports heretofore proposed for use in optical fiber cables.

49 Claims, 1 Drawing Sheet

MELT EXTRUDED ELONGATED MEMBER SUITABLE FOR IMPROVED SERVICE AS A STIFFENING SUPPORT IN AN OPTICAL FIBER CABLE

CROSS-REFERENCE TO RELATED APPLICATION

In our copending U.S. Ser. No. 364,823 filed concurrently herewith, now abandoned, entitled "Improved Optical Fiber Cable and Method for Producing Same" is claimed an optical fiber cable which in some embodiments may incorporate the melt extruded elongated member of the present invention. The disclosure of this companion application is incorporated herein by reference in its entirety.

BACKGROUND OF THE INVENTION

Optical fibers are being increasingly looked to as a medium in which information can be conveniently transmitted by light waves. Such mode of communication offers significant advantages over more conventional transmission media (e.g., copper wire) wherein electrical impulses are utilized. Illustrative examples of the advantages offered by fiber optics include: (a) an increased information transmission capability primarily because of the large available bandwidth, (b) immunity to electromagnetic interference, (c) reduced size and weight, (d) improved transmission security which precludes tapping without detection, and (e) better transmission quality. The optical fibers required for such transmissions commonly are formed of glass or transparent plastic and are recognized commonly to be delicate, brittle, and fragile and to necessitate special measures to insure their safety during installation and use. For instance, excessive bending will irreversibly destroy the usefulness of such fibers and elongations of less than one percent commonly will result in complete breakage (e.g., 0.12 to 0.25 percent elongation to break).

Heretofore when optical fibers have been used in communications applications they have been present in a cable assembly which is intended to provide the required safety for the same. The provision of certain strength or stiffening members within the optical fiber cable has heretofore been recognized to be essential to insure the survival of the delicate optical fibers. For instance, the use of metal wire reinforcement has been proposed in U.S. Pat. Nos. 3,865,466 to Slaughter and 4,110,001 to Olszewski. Other materials such as stainless steel wire, nylon, lyotropic liquid crystalline aramid polymer (e.g., Kevlar poly(p-phenylene terephthalamide), polyethylene, polyethylene terephthalate, cotton, E and S glass/epoxy rods, etc., have also been proposed. See, for instance, U.S. Pat. Nos. 4,037,922 to Claypoole, 4,093,342 to Foord et al, and 4,226,504 to Bellino.

Metal wire reinforcement of the prior art has had the disadvantage of introducing a electrical conductor within the cable assembly which destroys its usefulness for a number of end use applications via electrical interference. Such metallic cable component adds significantly to the weight of the resulting cable thereby militating against handling ease. Also, the metallic component due to thermal expansion and contraction may create problems during use of the cable under varying environmental conditions and to render the cable susceptible to lightning damage.

The use of poly(p-phenylene terephthalamide) as the reinforcement has first necessitated the dissolution of the polymer in an appropriate solvent for the same, and the solution spinning of a large number of relatively fine denier fibers (e.g. thousands of filaments) which may optionally be embedded in an appropriate resin (e.g., an epoxy resin) to form the stiffening member. Such poly(p-phenylene terephthalamide) is incapable of melt extrusion and the procedures required to form the reinforcing member are time consuming, and involve considerable expense. Also, the resulting stiffening member because of the fabrication techniques inherently required is only with difficulty amenable to formation into complex cross-sectional configurations.

Reinforcing members available in the prior art which are composed of E and S glass/epoxy rods are commonly formed by pultrusion and have been found to present shortcomings during service within the resulting cable assembly. For instance, such rods may be susceptible to undesirable thermal expansion and contraction and have tended to be unduly inflexible and relatively brittle which may result in cable failure if the cable assembly is sharply bent.

It is an object of the present invention to provide a novel elongated member suitable for improved service as a stiffening support in an optical fiber cable which is relatively free of shortcomings and disadvantages which reside in the production and service characteristics of the stiffening supports of the prior art.

It is an object of the present invention to provide an elongated member suitable for improved service as a stiffening support in an optical fiber cable.

It is an object of the present invention to provide an elongated member suitable for improved service as a stiffening support in an optical fiber cable which can be economically formed via melt extrusion.

It is an object of the present invention to provide an elongated member suitable for improved service as a stiffening support in an all-dielectric optical fiber cable which can be economically formed via melt extrusion.

It is another object of the present invention to provide an elongated member suitable for improved service as a stiffening support in an optical fiber cable which possesses properties capable of maximizing the survival potential of the delicate optical fiber component of the cable.

It is a further object of the present invention to provide an elongated member suitable for improved service as a stiffening support in an optical fiber cable which exhibits extraordinary dimensional stability at elevated temperatures thereby minimizing potential damage to the delicate optical fibers an making possible the use of the resulting optical fiber cable over a broader temperature range.

These and other objects, as well as the scope, nature, and utilization of the claimed invention will be apparent to those skilled in the art from the following detailed description and appended claims.

SUMMARY OF THE INVENTION

A melt extruded elongated member of substantially uniform cross-sectional configuration is provided which is suitable for improved service as a stiffening support in an optical fiber cable composed of a thermotropic liquid crystalline polymer having (a) a tensile modulus of approximately 4,000,000 to 20,000,000 psi, (b) a tensile strength of at least 40,000 psi, (c) a cross-sectional area of at least $7.85 \times 10^{-5}$ square inch wherein no substantial portion of the cross-section measures less than approximately 0.01 inch or more than approximately 0.2 inch, (d) a length of at least one mile, and (e) an aspect ratio of at least 316,800 computed on the basis of the minimum cross-section measurement.

BRIEF DESCRIPTION OF THE DRAWINGS

The drawings illustrate representative cross-sectional configurations for the melt extruded elongated member in accordance with the present invention which is suitable for improved service as a stiffening support in an optical fiber cable.

DESCRIPTION OF THE PREFERRED EMBODIMENTS

The polymer from which the elongated members of the present invention is formed must be a thermotropic liquid crystalline polymer which is of the requisite molecular weight to be capable of undergoing melt extrusion. Such thermotropic liquid crystalline polymers have been known in the art but have not prior to the present invention been recognized to be suitable for forming the presently claimed elongated article which has been found to be capable of improved service as a stiffening support in an optical fiber cable.

As is known in polymer technology a thermotropic liquid crystalline polymer exhibits optical anisotropy in the melt. The anisotropic character of the polymer melt may be confirmed by conventional polarized light techniques whereby crossed-polarizers are utilized. More specifically, the anisotropic nature of the melt phase may conveniently be confirmed by the use of a Leitz polarizing microscope at a magnification of 40X with the sample on a Leitz hot stage and under a nitrogen atmosphere. The amount of light transmitted changes when the sample is forced to flow; however, the sample is optically anisotropic even in the static state. On the contrary typical melt processable polymers do not transmit light to any substantial degree when examined under identical conditions.

Representative classes of polymers from which the thermotropic liquid crystalline polymer suitable for use in the present invention may be selected include wholly aromatic polyesters, aromatic-aliphatic polyesters, wholly aromatic poly (ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(esteramide). In such wholly aromatic polyester and wholly aromatic poly(ester-amide) each moiety present within the polymer chain contributes at least one aromatic ring. Also, it is preferred than naphthalene moieties be included in the thermotropic liquid crystalline polymer, e.g. 6-oxy-2-naphthoyl moiety, 2,6-dioxynaphthalene moiety, or 2,6-dicarboxynaphthalene moiety, in a concentration of not less than about 10 mole percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. Pat. Nos. which are herein incorporated by reference: 3,991,013; 3,991,014; 4,066,620; 4,067,852; 4,075,262; 4,083,829; 4093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,299,756; and 4,294,955; and in commonly assigned U.S. Ser. Nos. 91,003, filed Nov. 5, 1979 (now U.S. Pat. No. 4,337,191) 169,014 filed July 15, 1980 (now U.S. Pat. No. 4,337,190); 194,196 filed Oct. 6, 1980 (now U.S. Pat. No. 4,318,841) and 270,440 filed June 4, 1981 (now U.S. Pat. No. 4,355,134) which are herein incorporated by reference. As discussed hereafter the wholly aromatic polyester of U.S. Pat. No. 4,161,470 is particularly preferred for use in the present invention.

Representative aromatic-aliphatic polyesters which exhibit thermotropic liquid crystalline properties ar copolymers of polyethylene terephthalate and hydroxybenzoic acid as disclosed in *Polyester X-7G-A Self Reinforced Thermoplastic*, by W. J. Jackson, Jr. H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I Preparation and Properties of p-Hydroxybenzoic Acid Copolymers, *Journal of Polymer Science, Polymer Chemistry Edition*, Vol. 14, pages 2043 to 2058 (1976), by W. J. Jackson, Jr. and H. F. Kuhfuss. See also commonly assigned U.S. Ser. Nos. 194,199, filed Oct. 6, 1980 (now U.S. Pat. No. 4,318,842), and 287,345, filed July 27, 1981 (now U.S. Pat. No. 4,355,133) which are herein incorporated by reference.

Representative wholly aromatic and aromatic-aliphatic poly(ester-amides) which exhibit thermotropic liquid crystalline properties are disclosed in U.S. Pat. No. 4,272,625 and in commonly assigned U.S. Ser. Nos. 214,557, filed Dec. 9, 1980 (now U.S. Pat. No. 4,330,457); 251,625, filed Apr. 6, 1981 (now U.S. Pat. No. 4,351,917); 251,629, filed Apr. 6, 1981; 251,818, filed Apr. 7, 1981 (now U.S. Pat. No. 4,341,688); 251,819, filed Apr. 7, 1981 (now U.S. Pat. No. 4,355,132); and 270,439 filed June 4,1981 (now U.S. Pat. No. 4,339,375) which are herein incorporated by reference. As discussed hereafter the poly(ester-amide) of U.S. Ser. No.

214,557 (now U.S. Pat. No. 4,330,457) is particularly preferred for use in the present invention.

Representative aromatic polyazomethines which exhibit a thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly (nitrilo-2-methyl-1,4-phenylenenitriloethylidyne-1,4-phenyleneethylidyne); poly(nitrolo-2-methyl-1,4-phenylenenitrilomethylidyne-1,4-phenylene-methylidyne); and poly(nitrilo-2-chloro-1,4-phenylenenitrilomethylidyne-1,4-phenylenemethylidyne).

Representative aromatic polyester-carbonates which exhibit thermotropic liquid crystalline properties are disclosed in U.S. Pat. Nos. 4,107,143, and 4,284,757, and in commonly assigned,, U.S. Ser. No. 319,024, filed Nov. 6, 1981 (now U.S. Pat. No. 4,371,660), which are herein incorporated by reference. Examples of such polymers include those consisting essentially of p-oxybenzoyl units, p-dioxyphenyl units, dioxycarbonyl units, and terephthoyl units.

A thermotropic liquid crystalline polymer commonly is selected for use in the formation of the elongated member of the present invention which possesses a melting temperature within the range that is amenable to melt extrusion while employing commercially available equipment. For instance, thermotropic liquid crystalline polymers commonly are selected which exhibit a melting temperature somewhere within the range of approximately 250° to 400° C.

The thermotropic liquid crystalline polymer selected preferably also exhibits an inherent viscosity of at least 2.0 dl./g. when dissolved in a concentration of 0.1 percent by weight pentafluorophenol at 60° C. (e.g. an inherent viscosity of approximately 2.0 to 15.0 dl./g.).

The particularly preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 73 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Such polymer preferably has an inherent viscosity of approximately 3.5 to 10 dl./g. when dissolved in a concentration of 0.1 percent by weight in pentafluorophenol at 60° C.

The particularly preferred wholly aromatic poly(esteramide) or aromatic-aliphatic poly(ester-amide) for use in the present invention is disclosed in commonly assigned U.S. Ser. No. 214,557, filed Dec. 9, 1980 (now U.S. Pat. No. 4,330,457), which is capable of forming an anisotropic melt phase at a temperature below approximately 400° C. The poly(ester-amide)s there disclosed consist essentially of recurring moieties I, II, III, and, optionally, IV wherein:

I is

II is where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxy aryl moiety II is:

the preferred moiety III is:

and the preferred dioxy aryl moiety IV is:

Such polymer preferably has an inherent viscosity of approximately 2.0 to 10 dl./g. when dissolved in a concentration of 0.1 percent by weight in pentafluorophenol at 60° C.

When forming the melt extruded elongated member of the present invention conventional melt extrusion apparatus can be used wherein an extrusion die is selected having a shape which corresponds to the cross-sectional configuration of the elongated member to be formed with the exception that the orifice dimensions will be larger than the dimensions of the resulting elongated member in view of draw-down of the molten polymer which occurs immediately following extrusion. Polymers other than thermotropic liquid crystalline polymers are recognized to be incapable of melt extrusion to form articles of the cross-sectional area herein discussed wherein the profile will accurately correspond to the die shape. Accordingly, the thermotropic liquid crystalline polymers do not exhibit any substantial elastic recoil upon exiting from the extrusion die as do conventional polymers which are melt extruded. Suitable extrusion apparatus are described, for example, in the "Plastics Engineering Handbook" of the Society of the Plastics Industry, Pages 156 to 203, 4th Edition, edited by Joel Frados, Van Nostrand Reinhold Company, 1976. The elongated members of the present invention optionally may be formed in accordance with the teachings of commonly assigned U.S. Ser. No. 169,013, filed July 15, 1980 (now U.S. Pat. No. 4,332,759) of Yoshiaki Ide, entitled "Process for Extruding Liquid Crystal Polymer."

The temperature and pressure conditions selected for extruding the molten thermotropic liquid crystalline polymer will be influenced by the melting temperature of the polymer and its viscosity a will be apparent to those skilled in the art. Typically extrusion temperatures approximately 0° to 30° C. above the polymer melting temperature and pressures of approximately 100 to 5,000 psi are selected. In order to induce relatively high molecular orientation coextensive with the length of the elongated member, the extrudate is drawn while in the melt phase immediately adjacent the extrusion orifice and prior to complete solidification. The extent of such draw-down is influenced by the takeup speed under which the elongated member is wound or otherwise collected on an appropriate support or collection device. The resulting draw ratio is defined as the ratio of the die cross-sectional area to that of the cross-sectional area of the fully solidified extrudate. Such draw ratios commonly range between 4 and 100, and preferably between approximately 10 and 50 while utilizing the equipment described in the Examples.

In addition to the draw-down appropriate cooling must be applied to the extrudate of thermotropic liquid crystalline polymer intermediate the extrusion orifice and the point of collection. Appropriate fluid media, e.g. a gas or a liquid, may be selected to impart the desired cooling. For instance, the extrudate may be simply contacted by a stream of air or other gas or preferably immersed in a circulating bath of water or other liquid which is maintained at an appropriate temperature to impart the cooling required for solidification.

Figures 1, 2, 3:
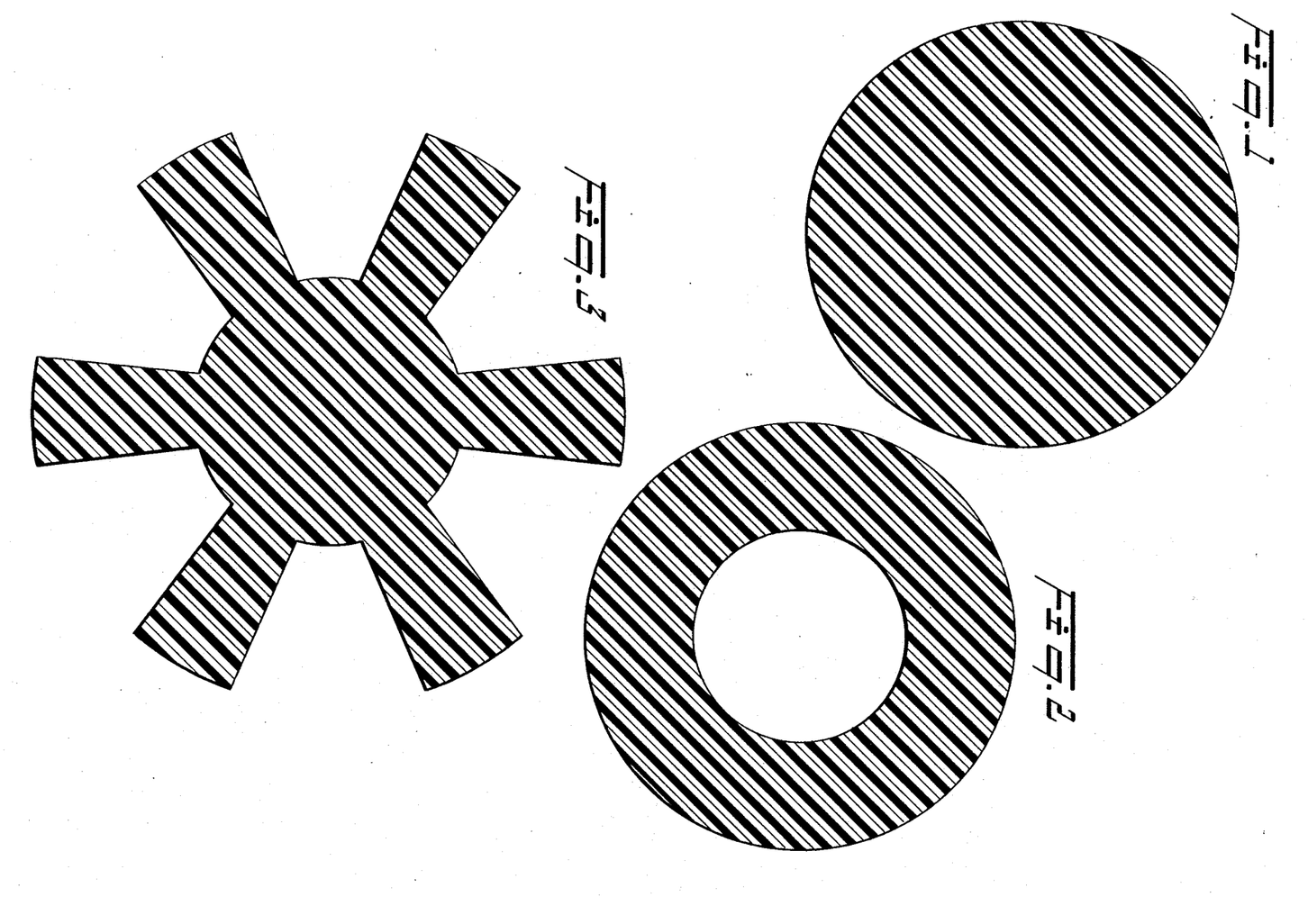
FIG. 1 illustrates the cross-sectional configuration a melt extruded elongated member in accordance with the present invention wherein the cross-section is circular and has a diameter of 0.026 inch as formed in Example 1.
FIG. 2 illustrates the cross-sectional configuration of a melt extruded elongated member in accordance with the present invention wherein the cross-section is tubular and has an outer diameter of 0.040 inch, and a wall thickness of 0.010 inch as formed in Example 3.
FIG. 3 illustrates the cross-sectional configuration of a melt extruded elongated member in accordance with the present invention wherein the cross-section has a central core and a plurality of projections radiating outwardly therefrom with the channels between projections forming locations for the disposition of a plurality of delicate optical fibers during the formation of an optical fiber cable. The diameter of the central core of the elongated member illustrated is 0.050 inch as measured to where the projections begin, and the radial projections each have a length of 0.030 inch beyond the core, and a width which ranges from 0.015 to 0.020 inch.

As illustrated in the drawings, the cross-sectional configuration of the melt extruded elongated member of the present invention which is suitable for improved service as a stiffening support in an optical fiber cable can be varied widely and can conform to the requirements of a large variety of optical cable designs. The resulting cross-sectional configuration is substantially uniform and can be monitored by use of a laser or other appropriate sensing device to insure the quality control demanded by the optical fiber cable industry. The elongated members of the present invention possess a cross-sectional area of at least $7.85 \times 10^{-5}$ square inch (e.g. $7.85 \times 10^{-5}$ to $3.14 \times 10^{-2}$ square inch) wherein no substantial portion of the cross-section measures less than approximately 0.01 inch or more than approximately 0.2 inch. Accordingly, the smallest width for an elongated member of the present invention is considerably larger in cross-sectional area than the 58.3 denier fiber described in Example 12 of, U.S. Ser. No. 214,557, filed Dec.9, 1980 (now U.S. Pat. No. 4,330,459) which would have a diameter of only approximately 0.003 inch and a cross-sectional area of only approximately $6.9 \times 10^{-6}$ square inch (i.e. it is more than 10 times smaller in cross-sectional area in Example 12). In a preferred embodiment no substantial portion of the cross-section measures less than approximately 0.02 inch or more than approximately 0.2 inch. Under such circumstances the cross-sectional area will be within the range of $3.14 \times 10^{-4}$ to $3.14 \times 10^{-2}$ square inch.

In preferred embodiments the elongated members of thermotropic liquid crystalline polymer have a uniform circular cross section and a diameter of approximately 0.025 to 0.08 inch. Preferred tubular elongated members of thermotropic liquid crystalline polymer have an outer diameter of approximately 0.04 to 0.2 inch, and a wall thickness of no less than 0.01 inch (e.g. 0.01 to 0.05 inch in preferred embodiments).

The melt extruded elongated members of the present invention have a length of at least one mile, and preferably a length of at least four miles (e.g. a length of four to seven miles or more). Accordingly, the length of the elongated member advantageously corresponds to the length of optical fiber cable which is situated between transmission repeaters. If desired the length of the elongated member of thermotropic liquid crystalline polymer can be considerably longer than 7 miles. In all instances the aspect ratio (i.e. length divided by diameter) of the elongated member is at least 316,800 (e.g. 316,800 to 50,000,000 or more) computed on the basis of the minimum cross-sectional area and accordingly is extremely long for a melt extruded elongated member of the specified cross-sectional area.

If desired physical properties, such as tensile modulus, tensile strength, and elongation, of the solidified previously formed elongated member of thermotropic liquid crystalline polymer may optionally be enhanced by heat treatment at a temperature below the melting temperature of the thermotropic liquid crystalline polymer for a time sufficient to increase the melting temperature of the polymer by at least 10° C. For instance, the elongated member may be heated below the melting temperature while present in a nitrogen or other atmosphere for up to 24 hours at an elevated temperature within 50° C. of the polymer melting temperature.

The physical properties which reside in the elongated member of thermotropic liquid crystalline polymer are considered to be unique and to be totally unattainable with other polymers which are capable of undergoing melt extrusion.

The tensile modulus of the elongated member of thermotropic liquid crystalline polymer is extremely high and is approximately 4,000,000 to 20,000,000 psi (e.g. 5,000,000 to 15,000,000 psi). Such tensile modulus can be conveniently determined in accordance with the standard procedure of ASTM 2343-67 with strain gauge at 23° C. Accordingly, the elongated member of the present invention exhibits a remarkable tendency to withstand tensional strain of the type which would severly damage optical fibers because of their low elongation properties (e.g. approximately 0.12 to 0.25 percent elongation). Additionally, the elongated member of thermotropic liquid crystalline polymer typically exhibits an elongation of at about 1 percent prior to breakage (e.g. an elongation of 1 to 2 percent or 1 to 3 percent) and will withstand only slightly more elongation than typical optical fibers. Such elongation can be conveniently determined in accordance with the standard procedure of ASTM 2343-67 with strain gauge at 23° C. This elongation renders the elongated member of the present invention highly compatible for use with glass optical fibers.

The tensile strength of the elongated member of thermotropic liquid crystalline polymer is also high and is at least 40,000 psi (e.g. 75,000 to 150,000 psi). Such tensile strength can be conveniently determined in accordance with the standard procedure of ASTM 2343-67 with strain gauge at 23° C.

Additionally, the elongated member of thermotropic liquid crystalline polymer in accordance with the present invention has been found to exhibit a highly satisfactory coefficient of linear thermal expansion property unlike the metallic wires and glass rods presently utilized as stiffening member in optical fiber cables. For instance, in the stiffening members of the present invention the coefficient of linear thermal expansion is negative, and is readily controllable so as to approximate that of delicate glass optical fibers. In preferred embodiments the coefficient of linear thermal expansion of the elongated member of the present invention is within the range of approximately $-10 \times 10^{-6}$ to $-4 \times 10^{-6}/°$ F. The coefficient of linear thermal expansion of commercially available glass optical fibers commonly ranges from $+0.25 \times 10^{-6}$ to $+1.25 \times 10^{-6}/°$ F. Accordingly, the extent of the expansion and contraction tendency of the elongated member of thermotropic liquid crystalline polymer tends to beneficially counteract the expansion and contraction of other elements incorporated within a optical fiber cable. The coefficient of linear thermal expansion can be conveniently determined with a DuPont thermomechanical analyzer while examining the elongated member at temperatures below 100° C.

The elongated member of thermotropic liquid crystalline polymer in accordance with the present invention may be incorporated as a stiffening member in optical fiber cables of a wide variety of designs including those disclosed in our copending U.S. Ser. No. 364,283, filed concurrently herewith, entitled "Optical Fiber Cable and Method for Producing Same", which is herein incorporated by reference.

The following examples are presented as specific illustrates of the claimed invention. It should be understood, however, that the invention is not limited to the specific details set forth in the examples.

EXAMPLE 1

A wholly aromatic polyester which exhibits thermotropic liquid crystalline properties was selected for use in the formation a melt extruded elongated member in accordance with the present invention. The wholly aromatic polyester was formed in accordance with the teachings of U.S. Pat. No. 4,161,470 and consisted of 73 mole percent of recurring poxybenzoyl units and 27 mole percent of recurring 6-oxy-2-naphthoyl units. The wholly aromatic polyester exhibited an inherent viscosity of 8.4 dl./g. when dissolved in·a concentration of 0.1 percent by weight in pentafluorophenol at 60° C., and a differential scanning calorimetry melting temperature peak of 289° C.

The molten wholly aromatic polyester while at a temperature of 290° C. and under a pressure of 1330 psi was extruded through a tapered circular die having a full entry angle of 60° and an exit opening of 0.25 inch diameter and a land length of 0.25 inch, positioned on a Brabender extruder. Immediately before the die filter screens of 100/20/150/20/200 mesh were placed and were followed by a grid to induce elongational flow in accordance with the teachings of commonly assigned U.S. Ser. No. 169,013. The pressure was measured upstream from the filter screens. The molten polymer was extruded into a quench bath having a length of four feet which consisted of circulating tap water at a temperature of approximately 15° to 20° C. The resulting solidified elongated member had a length of 1.2 miles and was wrapped on a rotating twelve inch diameter take-up roll which was travelling at a rate of approximately 100 feet per minute. The rotation of the takeup roll produced a draw-down of approximately 92 prior to solidification. The resulting elongated member had a substantially uniform circular cross-section of 0.026 inch, a cross-sectional area of $5.3 \times 10^{-4}$ square inch, and an aspect ratio of 2,924,000. The circular cross-sectional configuration is illustrated in FIG. 1.

A portion of the elongated member was subjected to heat treatment in order to enhance its physical properties. More specifically, it was heated in a nitrogen atmosphere from room temperature to 250° C. over a period of one hour, and subsequently from 250° to 300° C. over a period of eleven hours. Following such heat treatment the differential scanning calorimetry melting temperature peak of the wholly aromatic polyester was 324° C. and the polymer was insoluble in pentafluorophenol.

The physical properties of the resulting elongated member are summarized below before and after the heat treatment.

|  | Before Heat Treatment | After Heat Treatment |
| --- | --- | --- |
| Tensile Modulus (psi) | 7,590,000 | 8,370,000 |
| Tensile Strength (psi) | 89,000 | 142,000 |
| Elongation (percent) | 1.26 | 1.75 |
| Coefficient of Linear Thermal Expansion (per °F.) | $-7.0 \times 10^{-6}$ | $-7.4 \times 10^{-6}$ |

EXAMPLE 2

Example 1 was substantially repeated with the exception that a wholly aromatic poly(ester-amide) which exhibits thermotropic liquid crystalline properties was substituted for the wholly aromatic polyester of Example 1 and different extrusion conditions were employed.

More specifically, the wholly aromatic poly(ester-amide) was formed in accordance with the teachings of commonly assigned, U.S. Ser. No. 214,557, filed Dec. 9, 1980 (now U.S. Pat. No. 4,330,457) and was derived from 60 mole percent of 6-hydroxy-2-naphthoic acid, 20 mole percent of terephthalic acid, and 20 mole percent of p-aminophenol. The wholly aromatic poly(ester-amide) exhibited an inherent viscosity of 4.41 dl./g. when dissolved in a concentration of 0.1 percent by weight in pentafluorophenol at 60° C., and a differential scanning calorimetry melting temperature peak of 284° C.

The molten poly(ester-amide) while at a temperature of 290° C. was extruded through a tapered circular die having a full entry angle of 60°, an exit diameter of 0.12 inch and a land length of 0.005 inch, positioned on a ZSK co-rotating twin screw extruder. The twin screw was designed to provide maximum shearing in the kneading section and was vented to remove volatiles. The molten extruded polymer was drawndown at a ratio of 18.4 by a rotating twelve inch diameter take-up roll which was travelling at a rate of 480 feet per minute. A water quench bath was utilized as described in Example 1. A substantially uniform circular rod was formed having a 0.028 inch diameter, a cross-sectional area of $6.2 \times 10^{-4}$ square inch, a length of 1.8 miles, and an aspect ratio of 4,073,000. The cross-sectional configuration is illustrated in FIG. 1. A portion of the elongated member also was heat treated as described in Example 1. Following such heat treatment the differential scanning calorimetry melting temperature peak of the wholly aromatic poly(ester-amide) was 312° C., and the inherent viscosity was 11.5 dl /g.

The physical properties of the resulting elongated member are summarized below before and after the heat treatment.

|  | Before Heat Treatment | After Heat Treatment |
| --- | --- | --- |
| Tensile Modulus (psi) | 8,800,000 | 9,250,000 |
| Tensile Strength (psi) | 106,000 | 185,000 |
| Elongation (percent) | 1.47 | 2.19 |
| Coefficient of Linear Thermal Expansion (per °F.) | $-6.7 \times 10^{-6}$ | $-7.8 \times 10^{-6}$ |

EXAMPLE 3

Example 1 can be substantially repeated to form an elongated member having a tubular cross-section as illustrated in FIG. 2. A tubular die of having an outer diameter of 0.08 inch and an inner diameter of 0.04 inch is selected and nitrogen gas at ambient temperature (i.e., 23° C.) is introduced into the center of the molten thermotropic liquid crystalline polymer. Also the extruded polymer is passed through a circular sizing die and an outer diameter of 0.04 inch which is associated with a vacuum sizing tank to insure the production of an elongated member having a substantially uniform cross-sectional configuration The resulting tubular elongated member has an outer diameter of 0.04 inch, a wall thickness of 0.01 inch, a length of 1.5 miles, a polymer cross-sectional area of $9.43 \times 10^{-4}$, and an aspect ratio of 9,504,000 wherein the wall thickness is considered to be the minimum cross-section measurement. It is anticipated that the other physical properties will be within the parameters specified herein.

EXAMPLE 4

Example 1 can be substantially repeated to form an elongated member wherein the cross-section has a central core and a plurality of projections radiating outwardly therefrom as illustrated in FIG. 3. A die of like cross-section but of larger dimensions is selected and the extruded elongated member is drawndown to the desired dimensions which are imparted with the aid of a subsequently positioned sizing die. The resulting elongated member has a central core of 0.05 inch diameter as measured to where the projections begin, and the radial projections each have a length of 0.03 inch beyond the core, and a width which ranges from 0.015 to 0.02 inch. The length is 1.5 miles, the polymer cross-sectional area is $5.1 \times 10^{-3}$ square inch, and the aspect ratio is 6,336,000 wherein the 0.015 minimum dimension of the projections is considered to be the minimum cross-section measurement. It is anticipated that the other physical properties will be within the parameters specified herein.

Although the invention has been described with preferred embodiments it is to be understood that variations and modifications may be employed without departing from the concept of the invention defined in the following claims.

We claim:

1. A melt extruded elongated member of substantially uniform cross-sectional configuration suitable for improved service as a stiffening support in an optical fiber cable which is composed of a thermotropic liquid crystalline polymer and has (a) a tensile modulus of approximately 4,000,000 to 20,000,000 psi, (b) a tensile strength of at least 40,000 psi, (c) a cross-sectional area of at least $7.85 \times 10^{-5}$ square inch wherein no substantial portion of the cross-section measures less than approximately 0.01 inch or more than approximately 0.2 inch, (d) a length of at least one mile, and (e) an aspect ratio of at least 316,800 computed on the basis of the minimum cross-section measurement.

2. A melt extruded elongated member of substantially uniform cross-sectional configuration suitable for improved service as a stiffening support in an optical fiber cable according to claim 1 wherein said thermotropic liquid crystalline polymer is selected from the group consisting of wholly aromatic polyesters, aromatic-aliphatic polyesters, wholly aromatic poly(ester-amides), aromatic-aliphatic poly(ester-amides), aromatic polyazomethines, aromatic polyester-carbonates, and mixtures of the foregoing.

3. A melt extruded elongated member of substantially uniform cross-sectional configuration suitable for improved service as a stiffening support in an optical fiber cable according to claim 1 wherein said thermotropic liquid crystalline polymer is a wholly aromatic polyester.

4. A melt extruded elongated member of substantially uniform cross-sectional configuration suitable for improved service as a stiffening support in an optical fiber cable according to claim 1 wherein said liquid crystalline polymer is an aromatic poly(ester-amide) or a wholly aromatic-aliphatic poly(ester-amide).

5. A melt extruded elongated member of substantially uniform cross-sectional configuration suitable for improved service as a stiffening support in an optical fiber cable according to claim 1 wherein said liquid crystalline polymer includes not less than about 10 mole percent of recurring units which include a naphthalene moiety.

6. A melt extruded elongated member of substantially uniform cross-sectional configuration suitable for improved service as a stiffening support in an optical fiber cable according to claim 1 wherein said thermotropic liquid crystalline polymer includes not less than about 10 mole percent of recurring units which include a naphthalene moiety selected from the group consisting of 6-oxy-2-naphthoyl moiety, a 2,6-dioxynaphthalene moiety, and a 2,6-dicarboxynaphthalene moiety 7. A melt extruded elongated member of substantially uniform cross-sectional configuration suitable for improved service as a stiffening support in an optical fiber cable according to claim 1 wherein said thermotropic liquid crystalline polymer includes not less than about 10 mole percent of recurring 6-oxy-2-naphthoyl moiety.

8. A melt extruded elongated member of substantially uniform cross-sectional configuration suitable for improved service as a stiffening support in an optical fiber cable according to claim 1 wherein said thermotropic liquid crystalline polymer is an aromatic polyester which consists essentially of the recurring moieties I and II which may include substitution of at least some of the hydrogen atoms present upon an aromatic ring wherein:

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mole percent of moiety I, and approximately 10 to 90 mole percent of moiety II.

9. A melt extruded elongated member of substantially uniform cross-sectional configuration suitable for improved service as a stiffening support in an optical fiber cable according to claim 1 wherein said thermotropic liquid crystalline polymer is a poly(ester-amide) which consists essentially of recurring moieties I, II, III, and, optionally, IV wherein:

I is

II is where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

10. A melt extruded elongated member of substantially uniform cross-sectional configuration suitable for improved service as a stiffening support in an optical fiber cable according to claim 1 wherein said thermotropic liquid crystalline polymer exhibits an inherent viscosity of at least 2.0 dl./g. when dissolved in a concentration of 0.1 percent by weight in pentafluorophenol at 60° C.

11. A melt extruded elongated member of substantially uniform cross-sectional configuration suitable for improved service as a stiffening support in an optical fiber cable according to claim 1 wherein said thermotropic liquid crystalline polymer exhibits an inherent viscosity of approximately 2.0 to 15.0 dl./g. when dissolved in a concentration of 0.1 percent by weight in pentafluorophenol at 60° C.

12. A melt extruded elongated member of substantially uniform cross-sectional configuration suitable for improved service as a stiffening support in an optical fiber cable according to claim 1 having a tensile modulus of approximately 5,000,000 to 15,000,000 psi.

13. A melt extruded elongated member of substantially uniform cross-sectional configuration suitable for improved service as a stiffening support in an optical fiber cable according to claim 1 having a tensile strength of approximately 75,000 to 150,000 psi.

14. A melt extruded elongated member of substantially uniform cross-sectional configuration suitable for improved service as a stiffening support in an optical fiber cable according to claim 1 having a cross-sectional area of $7.85 \times 10^{-5}$ to $3.14 \times 10^{-2}$ square inch.

15. A melt extruded elongated member of substantially uniform cross-sectional configuration suitable for improved service as a stiffening member in an optical fiber cable according to claim 1 having a length of approximately 4 to 7 miles.

16. A melt extruded elongated member of substantially uniform cross-sectional configuration suitable for improved service as a stiffening support in an optical fiber cable according to claim 1 wherein said aspect ratio is 316,800 to 50,000,000.

17. A melt extruded elongated member of substantially uniform cross-sectional configuration suitable for improved service as a stiffening support in an optical fiber cable according to claim 1 which has coefficient of linear thermal expansion of approximately $-10 \times 10^{-6}$ to $-4 \times 10^{-6}$/° F.

18. A melt extruded elongated member of substantially uniform cross-sectional configuration suitable for improved service as a stiffening support in an optical fiber cable according to claim 1 which has a circular cross-sectional configuration of approximately 0.01 to 0.2 inch diameter.

19. A melt extruded elongated member of substantially uniform cross-sectional configuration suitable for improved service as a stiffening support in an optical fiber cable according to claim 1 which has a circular cross-sectional configuration of approximately 0.025 to 0.08 inch diameter.

20. A melt extruded elongated member of substantially uniform cross-sectional configuration suitable for improved service as a stiffening support in an optical fiber cable according to claim 1 which has tubular cross-sectional configuration and a wall thickness of no less than approximately 0.01 inch.

21. A melt extruded elongated member of substantially uniform cross-sectional configuration suitable for improved service as a stiffening support in an optical fiber cable according to claim 1 which has a cross-sectional configuration wherein there is a central core and a plurality of projections radiating outwardly therefrom.

22. A melt extruded elongated member of substantially uniform cross-sectional configuration suitable for improved service as a stiffening support in an optical fiber cable according to claim 1 which has been subjected to a heat treatment at a temperature below the melting temperature of said thermotropic liquid crystalline polymer for a time sufficient to increase the melting temperature of said polymer at least 10° C.

23. A melt extruded elongated member of substantially uniform cross-sectional configuration suitable for improved service as a stiffening support in an optical fiber cable which is composed of a thermotropic liquid crystalline polymer and has (a) a tensile modulus of approximately 5,000,000 to 20,000,000 psi, (b) a tensile strength of approximately 75,000 to 150,000 psi, (c) a cross-sectional area of $3.14 \times 10^{-4}$ to $3.14 \times 10^{-2}$ square inch wherein no substantial portion of the cross-section measures less than approximately 0.01 inch or more than approximately 0.1 inch, (d) a length of at least four miles, and (e) a coefficient of linear thermal expansion of approximately $-10 \times 10^{-6}$ to $-4 \times 10^{-6}/°$ F.

24. A melt extruded elongated member of substantially uniform cross-sectional configuration suitable for improved service as a stiffening support in an optical fiber cable according to claim 23 wherein said thermotropic liquid crystalline polymer is a wholly aromatic polyester.

25. A melt extruded elongated member of substantially uniform cross-sectional configuration suitable for improved service as a stiffening support in an optical fiber cable according to claim 23 wherein said liquid crystalline polymer is an aromatic poly(ester-amide) or an aromatic-aliphatic poly(ester-amide).

26. A melt extruded elongated member of substantially uniform cross-sectional configuration suitable for improved service as a stiffening support in an optical fiber cable according to claim 23 wherein said liquid crystalline polymer includes not less than about 10 mole percent of recurring units which include a naphthalene moiety.

27. A melt extruded elongated member of substantially uniform cross-sectional configuration suitable for improved service as a stiffening support in an optical fiber cable according to claim 23 wherein said thermotropic liquid crystalline polymer includes not less than about 10 mole percent of recurring units which include a naphthalene moiety selected from the group consisting of 6-oxy-2-naphthoyl moiety, a 2,6-dioxynaphthalene moiety, and a 2,6-dicarboxynaphthalene moiety.

28. A melt extruded elongated member of substantially uniform cross-sectional configuration suitable for improved service as a stiffening support in an optical fiber cable according to claim 23 wherein said thermotropic liquid crystalline polymer includes not less than about 10 mole percent of recurring 6-oxy-2-naphthoyl moiety.

29. A melt extruded elongated member of substantially uniform cross-sectional configuration suitable for improved service as a stiffening support in an optical fiber cable according to claim 23 wherein said thermotropic liquid crystalline polymer exhibits an inherent viscosity of at least 2.0 dl./g. when dissolved in a concentration of 0.1 percent by weight in pentafluorophenol at 60° C.

30. A melt extruded elongated member of substantially uniform cross-sectional configuration suitable for improved service as a stiffening support in an optical fiber cable according to claim 23 wherein said thermotropic liquid crystalline polymer exhibits an inherent viscosity of approximately 2.0 to 10.0 dl./g. when dissolved in a concentration of 0.1 percent by weight in pentafluorophenol at 60° C.

31. A melt extruded elongated member of substantially uniform cross-sectional configuration suitable for improved service as a stiffening support in an optical fiber cable according to claim 23 wherein said thermotropic liquid crystalline polymer is an aromatic polyester which consists essentially of the recurring moieties I and II which may include substitution of at least some of the hydrogen atoms present upon an aromatic ring wherein:

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mole percent of moiety I, and approximately 10 to 90 mole percent of moiety II.

32. A melt extruded elongated member of substantially uniform cross-sectional configuration suitable for improved service as a stiffening support in an optical fiber cable according to claim 23 wherein said thermotropic liquid crystalline polymer is a poly(ester-amide) which consists essentially of recurring moieties I, II, III, and, optionally, IV wherein:

I is

II is where A is a divalent radical comprising at least one aromatic ring or a divalent trans-1,4-cyclohexylene radical;

III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and IV is —O—Ar'—O—, where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

33. A melt extruded elongated member of substantially uniform cross-sectional configuration suitable for improved service as a stiffening support in an optical fiber cable according to claim 23 which has a circular cross-sectional configuration of approximately 0.025 to 0.08 inch diameter.

34. A melt extruded elongated member of substantially uniform cross-sectional configuration suitable for improved service as a stiffening support in an optical fiber cable according to claim 23 which has tubular cross-sectional configuration, an outer diameter of approximately 0.04 to 0.2 inch, and a wall thickness of no less than approximately 0.01 inch.

35. A melt extruded elongated member of substantially uniform cross-sectional configuration suitable for improved service as a stiffening support in an optical fiber cable according to claim 23 which has a cross-sectional configuration wherein there is a central core and a plurality of projections radiating outwardly therefrom.

36. A melt extruded elongated member of substantially uniform cross-sectional configuration suitable for improved service as a stiffening support in an optical fiber cable according to claim 23 which has been subjected to a heat treatment at a temperature below the melting temperature of said thermotropic liquid crystalline polymer for a time sufficient to increase the melting temperature of said polymer at least 10° C.

37. A melt extruded elongated member of a substantially uniform circular cross-sectional configuration suitable for improved service as a stiffening support in an optical fiber cable which is composed of a thermotropic liquid crystalline polymer which consists essentially of the recurring moieties I and II which may include substitution of at least some of the hydrogen atoms present upon an aromatic ring wherein:

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mole percent of moiety I, and approximately 10 to 90 mole percent of moiety II, and has a diameter of approximately 0.025 to 0.08 inch, (b) a tensile modulus of approximately 5,000,000 to 20,000,000 psi, (c) a tensile strength of approximately 75,000 to 150,000 psi, (d) a length of at least 4 miles, and (e) a coefficient of linear thermal expansion of approximately $-10 \times 10^{-6}$ to $-4 \times 10^{-6}/°$ F.

38. A melt extruded elongated member of substantially uniform circular cross-sectional configuration suitable for improved service as a stiffening support in an optical fiber cable according to claim 37 wherein said thermotropic liquid crystalline polymer consists essentially of approximately 15 to 35 mole percent of moiety I and approximately 65 to 85 mole percent of moiety II.

39. A melt extruded elongated member of substantially uniform circular cross-sectional configuration suitable for improved service as a stiffening support in an optical fiber cable according to claim 37 wherein recurring moieties I and II of said thermotropic liquid crystalline polymer are the sole moieties present.

40. A melt extruded elongated member of substantially uniform circular cross-sectional configuration suitable for improved service as a stiffening support in an optical fiber cable according to claim 37 wherein recurring moieties I and II of said thermotropic liquid crystalline polymer are free of ring substitution.

41. A melt extruded elongated member of substantially uniform circular cross-sectional configuration suitable for improved service as a stiffening support in an optical fiber cable according to claim 37 wherein said thermotropic liquid crystalline polymer exhibits an inherent viscosity of approximately 3.5 to 10 dl./g. when dissolved in a concentration of 0.1 percent by weight in pentafluorophenol at 60° C.

42. A melt extruded elongated member of substantially uniform circular cross-sectional configuration suitable for improved service as a stiffening support in an optical fiber cable according to claim 37 which has been subjected to a heat treatment at a temperature below the melting temperature of said thermotropic liquid crystalline polymer for a time sufficient to increase the melting temperature of said polymer at least 10° C.

43. A melt extruded elongated member of a substantially uniform circular cross-sectional configuration suitable for improved service as a stiffening support in an optical fiber cable which is composed of a thermotropic liquid crystalline polymer which consists essentially of recurring moieties I, II, III, and, optionally, IV wherein:

I is

II is where A is a divalent radical comprising at least one aromatic ring or a divalent trans-1,4-cyclohexylene radical;
III is —Y—Ar—Z—, where Ar is a divalent radical comprising at least one aromatic ring, Y is O, NH, or NR, and Z is NH or NR, where R is an alkyl group of 1 to 6 carbon atoms or an aryl group; and
IV is —O—Ar'—O—, where Ar' is a divalent radical comprising at least one aromatic ring,
wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 40 to 80 mole percent of moiety I, approximately 5 to 30 mole percent of moiety II, approximately 5 to 30 mole percent of moiety III, and approximately 0 to 25 mole percent of moiety IV, and has (a) a diameter of approximately 0.025 to 0.08 inch; (b) a tensile modulus of approximately 5,000,000 to 20,000,000 psi, (c) a tensile strength of approximately 75,000 to 150,000 psi, (d) a length of at least four miles, and (e) a coefficient of linear thermal expansion of 1130 approximately $-10 \times 10^{-6}$ to $-4 \times 10^{-6}/°$ F.

44. A melt extruded elongated member of substantially uniform circular cross-sectional configuration suitable for improved service as a stiffening support in an optical fiber cable according to claim 43 wherein the molar concentration of moiety II in said thermotropic liquid crystalline polymer is approximately equal to the total molar concentration of moieties III and IV.

45. A melt extruded elongated member of substantially uniform circular cross-sectional configuration suitable for improved service as a stiffening support in an optical fiber cable according to claim 43 wherein said thermotropic liquid crystalline polymer comprises approximately 40 to 60 mole percent of moiety I, approximately 20 to 30 mole percent of moiety II, approximately 5 to 30 mole percent of moiety III, and approximately 0 to 15 mole percent of moiety IV.

46. A melt extruded elongated member of substantially uniform circular cross-sectional configuration suitable for improved service as a stiffening support in an optical fiber cable according to claim 43 wherein each of said moieties in said thermotropic liquid crystalline polymer is free of ring substitution.

47. A melt extruded elongated member of substantially uniform circular cross-sectional configuration suitable for improved service as a stiffening support in an optical fiber cable according to claim 43 wherein said A radical of moiety II in said thermotropic liquid crystalline polymer is a divalent radical comprising at least one aromatic ring.

48. A melt extruded elongated member of substantially uniform circular cross-sectional configuration suitable for improved service as a stiffening support in an optical fiber cable according t claim 43 wherein said thermotropic liquid crystalline polymer exhibits an inherent viscosity of approximately 2.0 to 15 dl./g when dissolved in a concentration of 0 1 percent by weight in pentafluorophenol at 60° C.

49. A melt extruded elongated member of substantially uniform circular cross-sectional configuration suitable for improved service as a stiffening support in an optical fiber cable according to claim 43 which has been subjected to a heat treatment at a temperature below the melting temperature of said tnermotropic liquid crystalline polymer for a time sufficient to increase the melting temperature of said polymer at least 10° C.

* * * * *